(12) United States Patent
Trujillo Gonzalez

(10) Patent No.: US 10,947,147 B2
(45) Date of Patent: Mar. 16, 2021

(54) DEVICE AND METHOD FOR FRACTURING A CONTAINER AND CONTAINER COMPRISING SUCH A DEVICE

(71) Applicant: Gabriel Trujillo Gonzalez, Mexico City (MX)

(72) Inventor: Gabriel Trujillo Gonzalez, Mexico City (MX)

( * ) Notice: Subject to any disclaimer, the term of this patent is extended or adjusted under 35 U.S.C. 154(b) by 12 days.

(21) Appl. No.: 16/324,629

(22) PCT Filed: Aug. 19, 2016

(86) PCT No.: PCT/IB2016/054983
§ 371 (c)(1),
(2) Date: Feb. 11, 2019

(87) PCT Pub. No.: WO2018/033780
PCT Pub. Date: Feb. 22, 2018

(65) Prior Publication Data
US 2019/0185364 A1    Jun. 20, 2019

(51) Int. Cl.
*C03B 33/06*        (2006.01)
*B02C 25/00*        (2006.01)
*B02C 23/00*        (2006.01)

(52) U.S. Cl.
CPC .............. *C03B 33/06* (2013.01); *B02C 23/00* (2013.01); *B02C 25/00* (2013.01)

(58) Field of Classification Search
CPC ....... B02C 23/00; B02C 25/00; B09B 3/9785; B26B 5/007; B26B 29/02; B25D 5/00;
(Continued)

(56) References Cited

U.S. PATENT DOCUMENTS 2,981,006 A * 4/1961 Keklikian ................ B25D 5/00
                                                        33/671
3,572,564 A   3/1971 Fleming
(Continued)

FOREIGN PATENT DOCUMENTS

DE        7105078 U    11/1971
DE    202004017402 U1    2/2005
(Continued)

OTHER PUBLICATIONS

International Search Report—PCT/IB2016/054983 dated Dec. 28, 2016.
(Continued)

*Primary Examiner* — Ghassem Alie
(74) *Attorney, Agent, or Firm* — Schmeiser, Olsen & Watts, LLP

(57) ABSTRACT

Provided is an expandable device for fracturing a container for liquids, for example beverages, in particular alcoholic beverages, made of glass or a similar material, wherein the device has a first retracted position according to which the device can be accommodated at least partially in a recess at a bottom section of the container without causing fracture to the container and a second extended position according to which the device is able to cause a fracture at a bottom section of the container by impact against a solid surface such as a table, with the aim to prevent reuse or recycle of the container, for example with adulterated beverages.

12 Claims, 14 Drawing Sheets

(58) Field of Classification Search
CPC ...... A62B 3/00; F42B 3/006; A61M 5/31528; A61M 5/3156; Y10T 83/8785; Y10T 83/0237; Y10T 83/9423; Y10T 83/9314; Y10T 83/828
USPC .............. 225/93, 96, 104; 83/866, 868, 520; 30/360, 366, 361, 444, 448, 442, 467, 30/368, 162, 164, 278, 289, 358; 606/207, 198; 220/278, 277, 260, 261, 220/262

See application file for complete search history.

(56) References Cited

U.S. PATENT DOCUMENTS

| | | | |
|---|---|---|---|
| 3,744,692 | A | 7/1973 | Doyel |
| 3,788,537 | A * | 1/1974 | Fox ........................ B25B 27/04 227/142 |
| 4,619,569 | A | 10/1986 | Wright |
| 5,215,265 | A | 6/1993 | Lodovico |
| 7,503,120 | B2 * | 3/2009 | Williams .............. B26B 27/007 30/165 |
| 2003/0136009 | A1 | 7/2003 | McNeill |
| 2006/0108461 | A1 | 5/2006 | Waldron |
| 2007/0107237 | A1 * | 5/2007 | Long ........................ B25D 5/00 30/360 |
| 2008/0009806 | A1 * | 1/2008 | Chang .............. A61B 5/150648 604/198 |
| 2009/0118753 | A1 * | 5/2009 | Dicesare .......... A61B 5/150564 606/182 |
| 2010/0175268 | A1 * | 7/2010 | Senesi .................... B26B 5/007 30/162 |
| 2010/0305512 | A1 * | 12/2010 | Guillermo ......... A61M 5/31528 604/207 |
| 2011/0313439 | A1 * | 12/2011 | Ishikura ............. A61B 5/15142 606/182 |
| 2012/0180287 | A1 * | 7/2012 | Rudgley ................. B25B 27/04 29/426.4 |
| 2012/0240417 | A1 | 9/2012 | Lee |
| 2013/0333542 | A1 | 12/2013 | Lehoux |

FOREIGN PATENT DOCUMENTS

| | | |
|---|---|---|
| EP | 1023943 A2 | 8/2000 |
| IE | S2006/0701 | 5/2007 |
| IE | S20060701 A2 | 5/2007 |
| MX | 2013006835 A | 12/2013 |
| MX | 2013006835 A | 12/2013 |
| WO | 03070374 A1 | 8/2003 |
| WO | WO03070374 A1 | 8/2003 |
| WO | 2007129877 A2 | 11/2007 |
| WO | WO2007129877 A2 | 11/2007 |
| WO | 2010004263 A1 | 1/2010 |
| WO | WO2010004263 A1 | 1/2010 |

OTHER PUBLICATIONS

Written Opinion—PCT/IB2016/054983.
International Search Report—PCT/IB2016/054983.

* cited by examiner

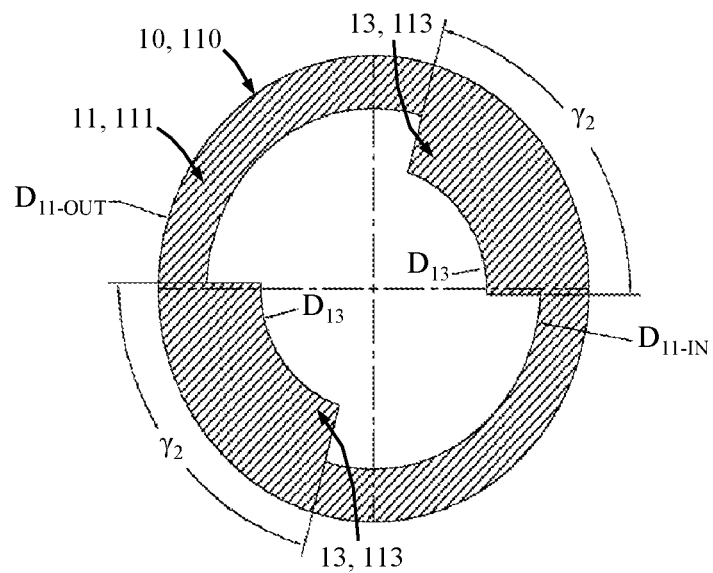
FIG. 8C
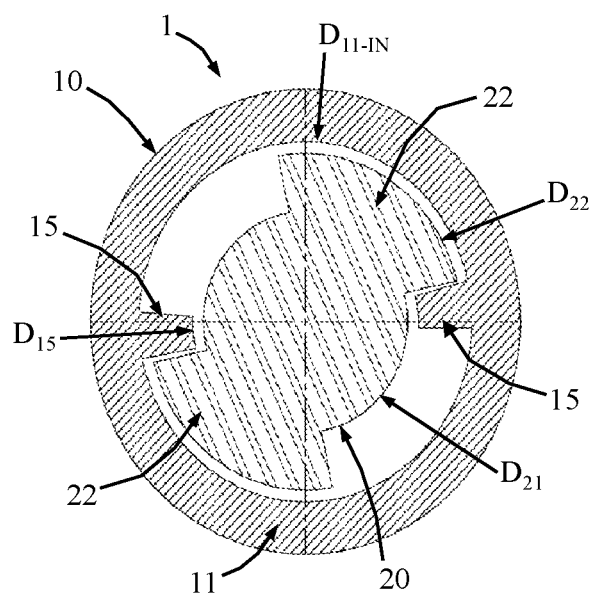 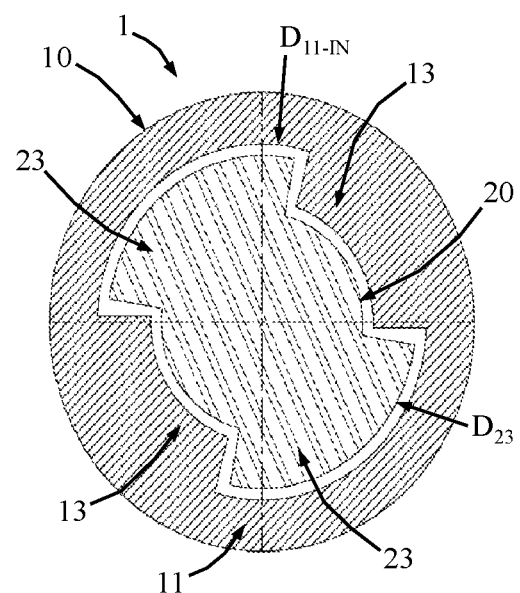
FIG. 8D          FIG. 8E

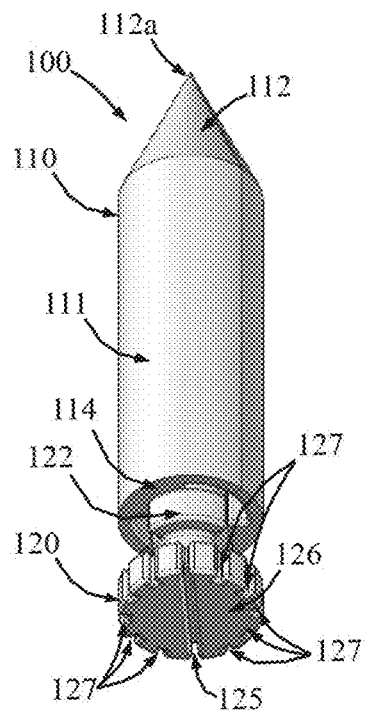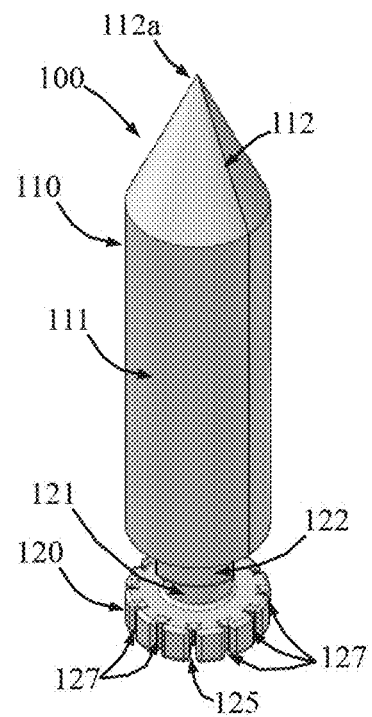
FIG. 10C  FIG. 10D
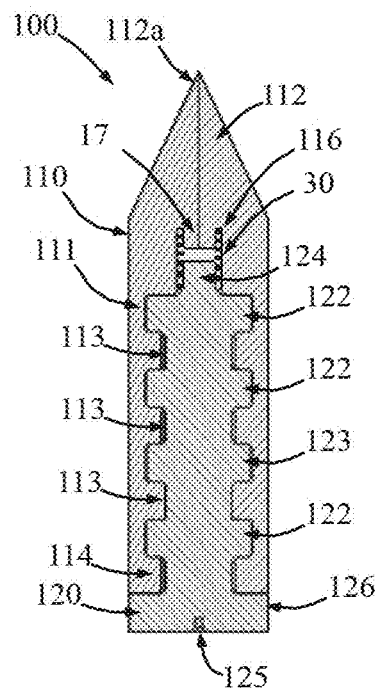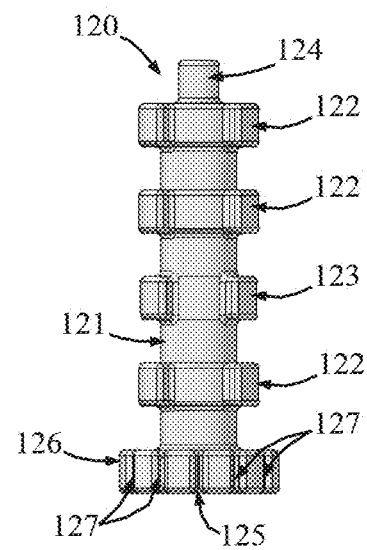
FIG. 10E  FIG. 10F

DEVICE AND METHOD FOR FRACTURING A CONTAINER AND CONTAINER COMPRISING SUCH A DEVICE

CROSS-REFERENCE TO RELATED APPLICATIONS

This application claims priority to PCT Application No. PCT/IB2016/054983, having a filing date of Aug. 19, 2016, the entire contents of which are hereby incorporated by reference.

FIELD OF TECHNOLOGY

The following relates to a device for fracturing at least partially a container, in particular for fracturing a bottom section of a container, which is made of glass or a similar material and which contains liquids such as beverages, in particular alcoholic beverages; wherein the device has a first retracted position and a second extended position; and wherein the device is able to fracture the bottom section of the container when it is in the second extended position once the container has been emptied in order to prevent reuse or recycling of the container.

The following also relates to a method to use the device in conjunction with a container to cause a fracture at the bottom of said container to prevent reuse or recycling of the container.

The following also relates to a container for liquid products such as beverages, in particular alcoholic beverages, the bottom section of which has a recess for at least partially accommodating the device according to embodiments of the invention.

Sale of adulterated alcoholic beverages is a worldwide problematic not only from the economical viewpoint, since lower prices of such beverages often results in being more attractive for consumers than authentic beverages, but also from the consumer's health viewpoint because adulterated alcoholic beverages generally, if not always, contain methanol (methyl alcohol) which is highly toxic even in lower amounts and lethal in greater amounts. Indeed, intake of adulterated alcohol may cause temporary or even permanent alterations including headaches, liver damage, blindness and death.

It is estimated that 4 in 10 bottles present in the worldwide market contain adulterated alcohol, which traduces in millions of liters of adulterated beverages around the globe, which also traduces in millionaire losses to producers, merchants and governments as well.

Both governments and producers have developed throughout several years numerous techniques with the aim to avoid these economical losses and to reduce risks to public health, the most relevant of which are directed, on the one hand, to closures or lids that prevent refill of the bottle and, on the other hand, to unforgeable seals or labels that authenticate the bottle and of course its contents. In fact, in the state of art, many documents are known which disclose inviolable closures and lids that prevent refill of a bottle and that make evident reuse thereof, as well as methods and techniques for labeling and/or sealing alcoholic beverage bottles.

Despite these techniques, there can still be found in the market adulterated bottles given that it is relatively easy to reuse or "recycle" an authentic bottle with adulterated alcohol once it has been emptied.

Therefore, there is a need for alternative solutions to prevent reuse or recycling of authentic bottles with adulterated beverages.

BACKGROUND

In this respect, there are known in the state-of-the-art machines and devices for breaking bottles to produce raw material for glass recycling. For instance, documents DE202004017402U1, EP1023943A2, IES2006/0701A2, U.S. Pat. No. 5,215,265, US2006/0108461A1 and WO2010/004263A1 describe industry machines for breaking glass bottles by means of rotary bars or blades inside a housing in which the bottles enter or fall by gravity. However, these machines are intended for handling and processing great amounts of bottles and for generating raw material for glass recycling, whereby these machines are inadequate to be used, for example, at home directly by the consumer of the bottle.

On the other hand, documents MX/a/2013/006835 and WO2007/129877A2 disclose apparatuses for cutting bottles by using a bottle holder mechanism and fixed cutters that cut the bottle from the outside when the bottle is caused to rotate about its longitudinal axis. Similarly, documents U.S. Pat. Nos. 3,572,564 and 3,744,692 describe devices for cutting sections of a glass bottle either from the inside or from the outside of the bottle by using a manual or automatic tool while the bottle is caused to rotate about its longitudinal axis. However, all these devices are disadvantageous in that they require complex means to maintain the bottle fixed and cause the same to rotate; further, these apparatuses also require cutting means or a cutter that can be dangerous for a user.

SUMMARY

An aspect relates to a device for fracturing in a safe manner at least a portion of a container, in particular a bottle made of glass or similar material such as ceramic, once it has been emptied to prevent reuse or recycling thereof.

In another aspect of embodiments of the invention, it is described a device for fracturing at least a section of a container, where the device is designed in such a manner that its shape and size allow the same to be placed in a safe manner inside a recess at the bottom section of the container without causing any fracture.

In still another aspect of embodiments of the invention, it is described a device able to be placed at the bottom section of a container and capable of extending by the action of rotation by the user of at least one portion of the device and further rotation causes the device to remain in an extended position thus being able to be hit against a solid surface, such as a table, to cause a fracture on at least a portion of the bottom section of the container.

In still another aspect of embodiments of the invention, it is described a method to use a device for fracturing at least a portion of a container, such as a bottle made of glass or a similar material, to avoid reuse or recycling of the container.

In yet another aspect of embodiments of the invention, it is described a container having a bottom section which is designed in such a manner to at least partially accommodate a device in accordance with at least one aspect of embodiments of the invention.

BRIEF DESCRIPTION

Some of the embodiments will be described in detail, with references to the following Figures, wherein like designations denote like members, wherein:

FIG. 8C is a cross-section view of the outer body along line VIIIC-VIIIC of FIG. 7C;

FIG. 8D is a cross-section view of the device along line VIIID-VIIID of FIG. 4A;

FIG. 8E is a cross-section view of the device according to embodiments of the invention in which the inner body can pass through the outer body;

FIG. 10C is a bottom-perspective view of the device depicted in FIG. 10A, where the device is in an extended position;

FIG. 10D is a top-perspective view of the device depicted in FIG. 10C;

FIG. 10E is a cross-section view of the device depicted in FIG. 10A;

FIG. 10F is a front view of the inner body of device according to embodiments of the invention;

DETAILED DESCRIPTION

Figure 1A:
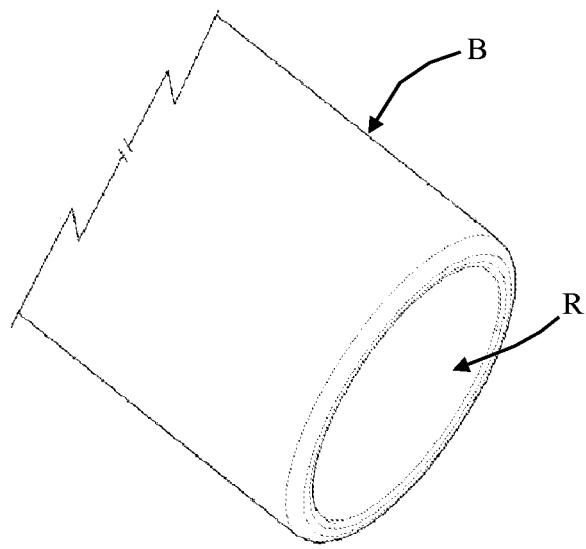
FIG. 1A is a partial perspective view of a bottom section of a bottle known in the state of the art.
Figure 1B:
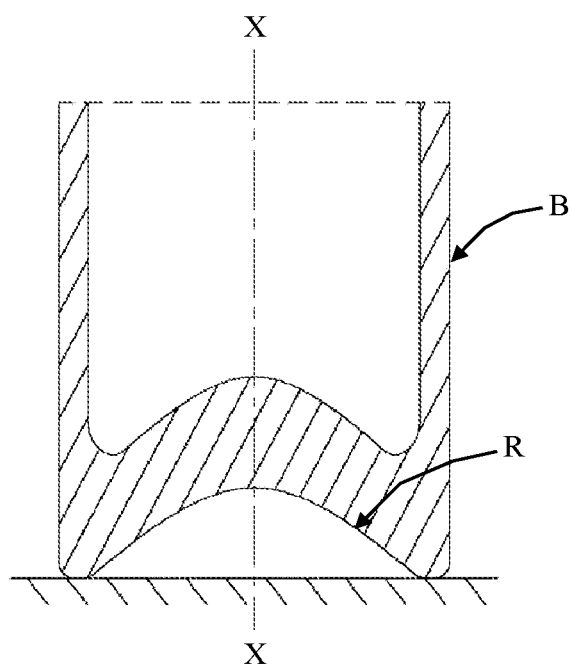
FIG. 1B is a cross-section view of the bottom section of the bottle depicted in FIG. 1A.

FIG. 1A shows a partial view of a bottom section of a bottle B which is known in the state of the art. For instance, the bottle B is made of glass and is used to contain a beverage, in particular alcoholic beverage. As shown in the cross-sectional view of FIG. 1B, the bottle B is designed having a recess R of concave shape protruding inwardly along the longitudinal axis X-X of the bottle B.

Bottles containing beverages of the aforementioned type can be easily reused or recycled given that it is relatively easy to refill the bottle with adulterated beverages and forge security means currently available such as labels and seals of the bottle lid.

Consequently, according to a first embodiment, it is described a device which can be arranged in a fixed or removable manner at the bottom section of a container so that, on the one hand, when the device is in a retracted position, it remains accommodated inside said bottom section of the container, and on the other hand, when the device is in an extended position, it protrudes at least partially out of said bottom section of the container thus allowing a user to hit the device against a solid surface such as a table thereby causing in a targeted and safe manner a fracture on the bottom section of the container, thus preventing the container from being reused or recycled with any other contents because the container will inevitably leak.

Figure 2A:
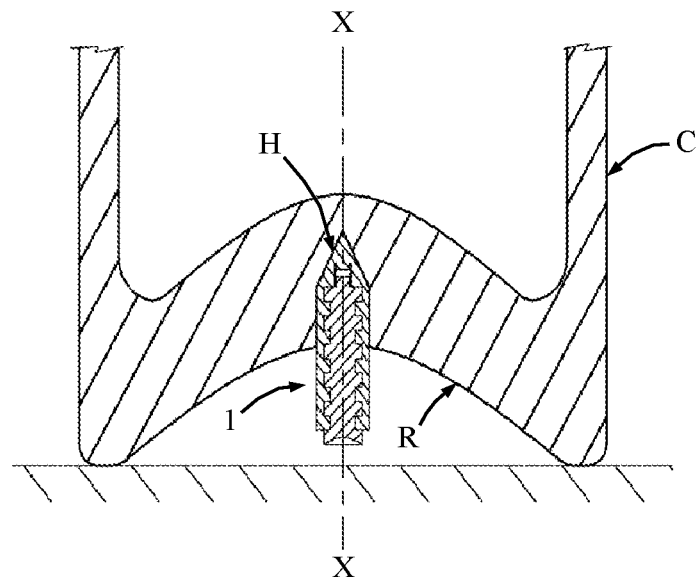
FIG. 2A is a cross-section view of a bottom of a container including a device in a retracted position in accordance with embodiments of the invention.
Figure 2B:
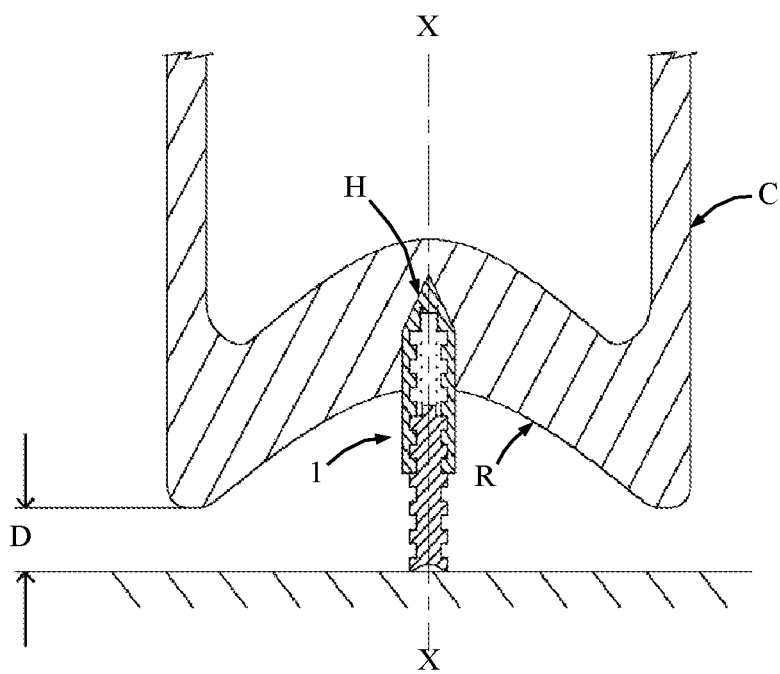
FIG. 2B is a cross-section view of a bottom of a container including a device an extended position according to which the device can cause a fracture in said bottom of the container.

Turning now to FIGS. 2A and 2B, there is shown a cross-section view of a bottom section of a container C and a device 1 in accordance with embodiments of the invention. Container C can be made of glass or a similar material such as ceramic, and it is intended to be filled with liquid, for example an alcoholic beverage. Container C has a bottom section including a recess R of concave shape protruding inwardly along the longitudinal axis X-X. Container C also includes a blind hole which defines a housing H of a shape suitable for accommodating at least partially, in a fixed or removable manner, the device according to embodiments of the invention.

As shown in FIG. 2A, device 1 is in a retracted position in such a manner that it does protrude out of the bottom section of the container C; that is to say, device 1 does not reach the surface onto which lies the bottom section of the container C. Therefore, it is possible for a manufacturer to provide the container together with the device and transport them to a point of sale in a safe manner as it is normally done.

As shown in FIG. 2B, device 1 has been manipulated by a user such that it is in an extended position. In this extended position of the device, at least a portion thereof protrudes out of the bottom section of the container C by a distance D. In said extended position of the device 1, at least a portion thereof remains inside the housing H of the container C. Further, in this extended position of the device 1, once the container C has been emptied, it is possible for a user to hit the device 1 against a solid surface such as a table, so that the device 1 directs the impact force towards the housing H thereby causing a fracture on the bottom section of the container C. Consequently, the fractured section of the container C will inevitably leak in case the container is refilled with liquid, thus making impossible to reuse or recycle that fractured container. Hence, an authentic container can no longer be used with adulterated beverages.

Figure 3A:
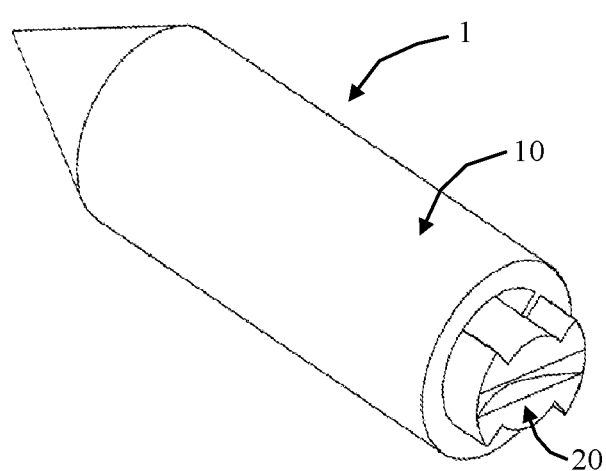
FIG. 3A is a perspective view of the device in a retracted position in accordance with embodiments of the invention.

FIG. 3A is a perspective view of device 1 according to embodiments of the invention. Device 1 is in a retracted position, for example as depicted in FIG. 2A, and before being mounted inside the housing H of the container C.

Figure 3C:
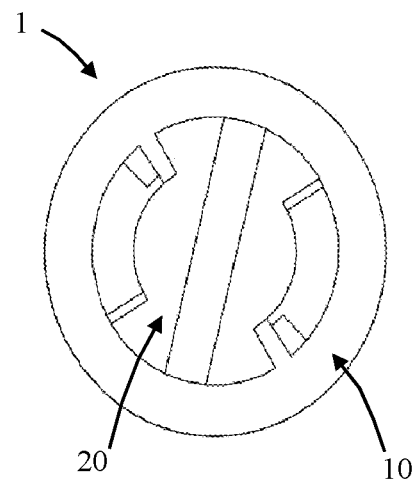
FIG. 3C is a bottom view of the device according to FIG. 3A.
Figure 3B:
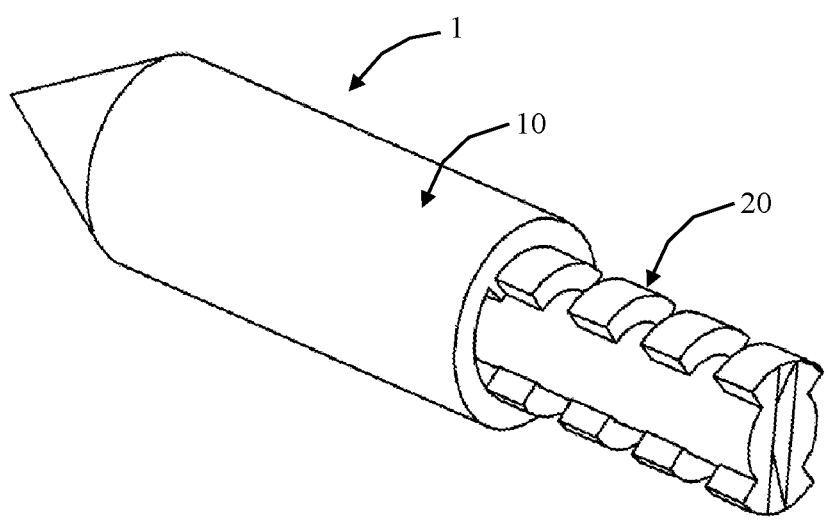
FIG. 3B is a perspective view of the device in an extended position in accordance with embodiments of the invention.

FIG. 3B is a perspective view of device 1 in an extended position, for example as depicted in FIG. 2B.

Device 1 comprises an outer body 10 and an inner body 20 which can rotate and slide relative the outer body 10 to be displaced from a retracted position to an extended position. Inner body 20 and outer body 10 are designed such that they can engage with one another thus forming a structure that is able to transmit impact forces from one another and such that inner body 20 is able to maintain a retracted or extended position relative the outer body 10.

FIG. 3C is a bottom view of device 1 in a retracted position as depicted for example in FIG. 3A.

Figure 4A:
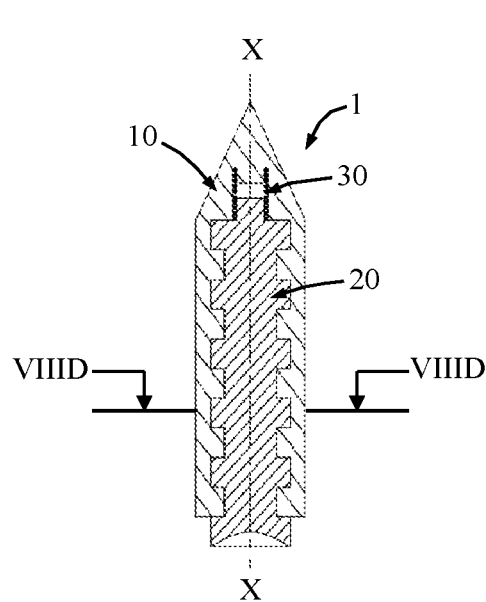
FIG. 4A is a cross-section view of the device depicted in FIG. 3A.

FIG. 4A is a cross-section view of device 1 as depicted in FIG. 3A, that is to say the device 1 is in a retracted position. It can be appreciated that inner body 20 has a shape configured to engage with the outer body 10 to maintain said retracted position.

Figure 4B:
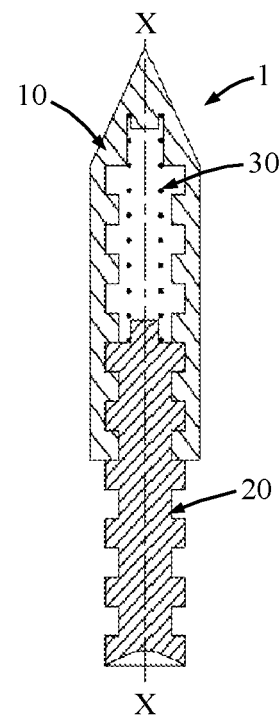
FIG. 4B is a cross-section view of the device depicted in FIG. 3B.

FIG. 4B is a cross-section view of the device 1 as depicted in FIG. 3B, that is to say the device 1 is in an extended position. It can be appreciated that the inner body 20 engages with outer body 10 to maintain said extended position. In embodiments of the invention, inner body 20 slid inside and relative the outer body 10 with the aid of an elastic member 30 as described herein below.

It can also be seen that device 1 further comprises an elastic member 30 which is configured to drive the inner body 20 inside and relative the outer body 10 during the movement of the inner body 20 from a retracted position to an extended position as described below.

Figure 5A:
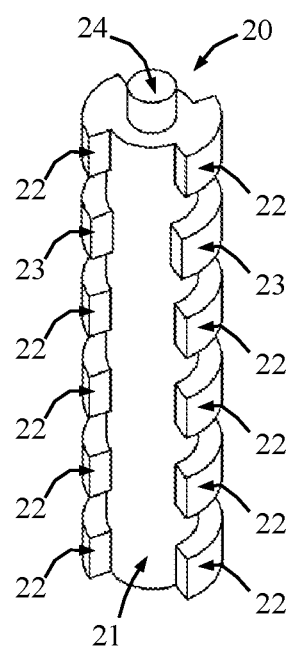
FIG. 5A is a perspective view of an inner body of the device according to embodiments of the invention.
Figure 5B:
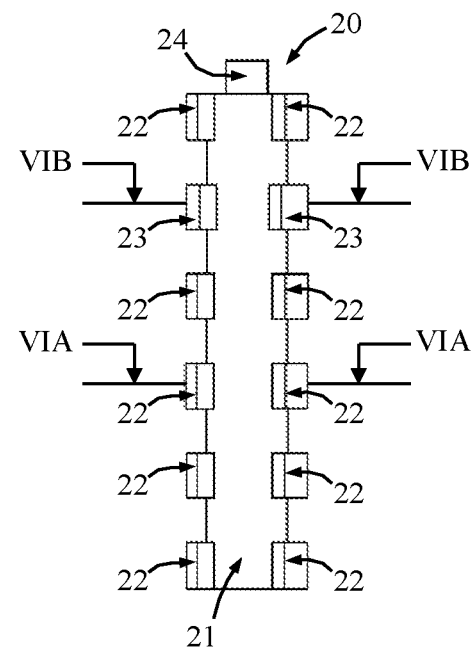
FIG. 5B is a front view of the inner body of the device depicted in FIG. 5A.

FIGS. 5A and 5B show details of inner body 20 of device 1 according to embodiments of the invention. Inner body 20 comprises a cylindrical body 21 having a plurality of radial ribs 22, 23 protruding from an outer wall of the cylindrical body 21 and arranged separated at equal distances from each other along a longitudinal section of the cylindrical body 21 and at opposite sides of the cylindrical body 21, that is to say each pair of radial ribs 22, 23 is arranged symmetrically relative the longitudinal axis of the inner body 20.

Inner body 20 further comprises a protrusion 24 at an upper end of cylindrical body 21. Protrusion 24 can accommodate at least partially the elastic member 30 when the inner body 20 is mounted inside the outer body 10.

Figure 5C:
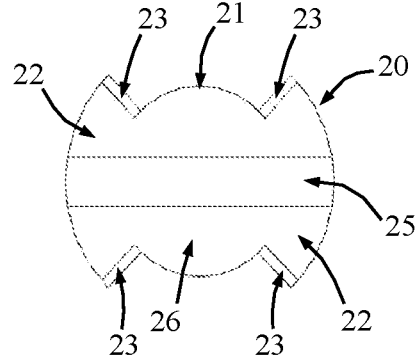
FIG. 5C is a bottom view of the inner body of the device depicted in FIGS. 5A and 5B.

FIG. 5C is a bottom view of the inner body 20 as depicted in FIGS. 5A-5B. Inner body 20 further comprises a notch 25 at a base section 26 of the inner body 20. Notch 25 extends across the cylindrical body 21 and two of the ribs 22 at the lower end of inner body 20. In use, notch 25 can be manipulated by a user, for example by using a finger nail, a coin or any other similar object, to cause rotation of the inner body 20 relative the outer body 10, as described in further detail below.

Figure 6A:
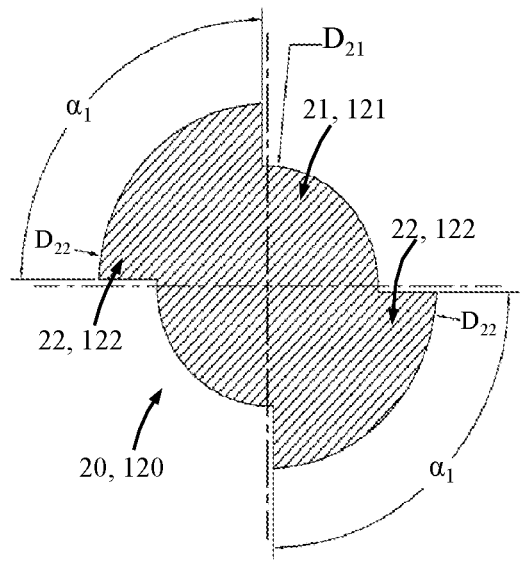
FIG. 6A is a cross-section view of the inner body of the device along line VIA-VIA of FIG. 5B.
Figure 6B:
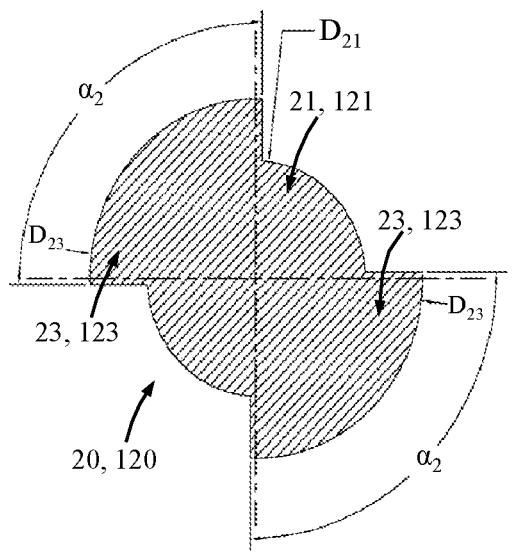
FIG. 6B is a cross-section view of the inner body of the device along line VIB-VIB of FIG. 5B.

FIG. 6A is a cross-section view of inner body 20 along line VIA-VIA of FIG. 5B. Each radial rib 22 encompasses or extends by an angle $\alpha_1$. Further, each radial rib 22 is designed as a semi-circumferential protrusion having a diameter $D_{22}$. FIG. 6B is a cross-section view of inner body 20 along line VIB-VIB of FIG. 5B. Each radial rib 23 encompasses or extends by an angle $\alpha_2$. Further, each radial rib 23 is designed as a semi-circumferential protrusion having a diameter $D_{23}$. Angle $\alpha_2$ of radial ribs 23 is greater than angle $\alpha_1$ of radial ribs 22, such that $\alpha_2 > \alpha_1$. For instance, angle $\alpha_2$ is at least 8° greater than angle $\alpha_1$. In particular, angle $\alpha_2$ may be 5°, 10° or up to 15° greater than the angle $\alpha_1$.

Diameter $D_{22}$ of radial ribs 22 is equal to diameter $D_{23}$ of radial ribs 23, such that $D_{22} = D_{23}$. Cylindrical body 21 has a diameter $D_{21}$ is the same along its entire length.

By way of example, in embodiments of the invention, angle $\alpha_1$ is equal to 86°±5°; angle $\alpha_2$ is equal to 94°±5°; diameter $D_{21}$ is equal to 3.8 mm±0.2 mm; and diameter $D_{22}$=diameter $D_{23}$ is equal to 5.8 mm±0.2 mm.

Figure 7A:
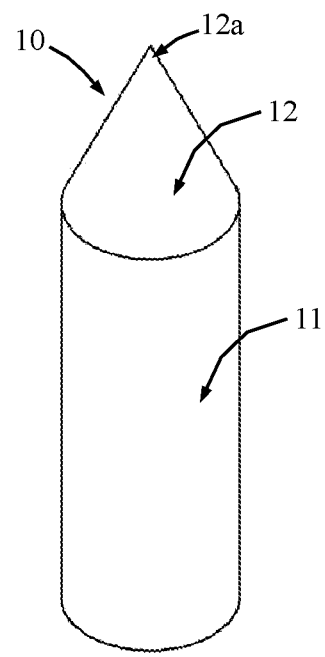
FIG. 7A is a perspective view of an outer body of the device according to embodiments of the invention.

Turning now to FIG. 7A, there is shown a perspective view of the outer body 10 according to embodiments of the invention. Outer body 10 comprises a hollow body 11 and a head 12 at one end of the hollow body 11. Hollow body 11 has an external shape which is suitable for being at least partially received in the housing H of container C, as depicted for example in FIGS. 2A and 2B. For instance, hollow body 11 has a cylindrical shape. Alternatively, although it is not shown in the drawings, hollow body 11 can be designed in a shape other than cylindrical, for example prismatic such as rectangular, hexagonal or octagonal. Head 12 is conically shaped such that it can direct in a targeted manner all forces applied to it at a tip 12a of the head 12 thereby causing a fracture on the housing H of container C, as explained in detail below.

Figure 7B:
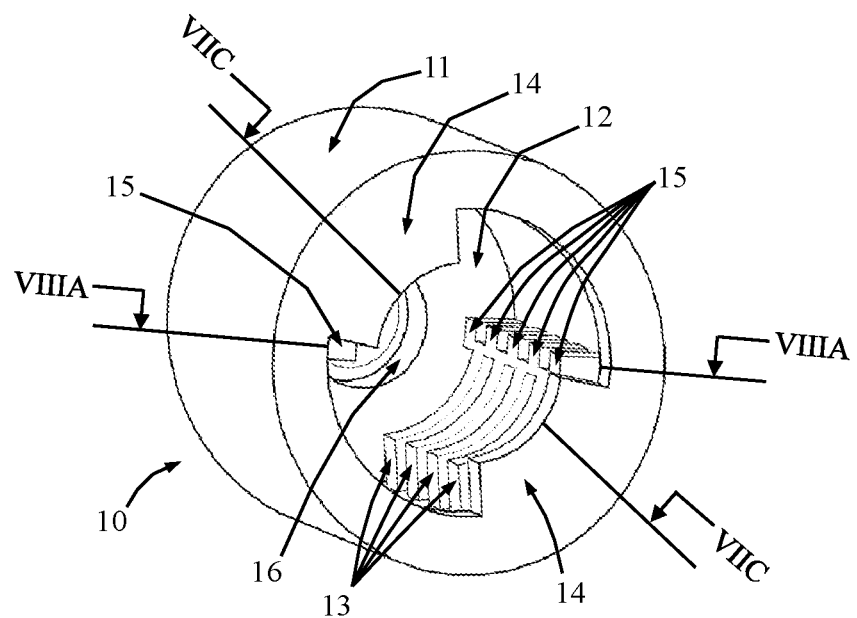
FIG. 7B is a bottom perspective view of the outer body of the device depicted in FIG. 7A.

FIG. 7B is a bottom-perspective view of outer body 10. Hollow body 11 comprises a plurality of radial ribs 13, 14 and 15 designed as semi-circumferential protrusions which are arranged separated from each other at equal distances along a longitudinal section of hollow body 11. Further, it can be appreciated that the radial ribs 14 are arranged at the bottom end of the hollow body 11 by taking FIG. 7A as reference. Radial ribs 13, 14 and 15 protrude inwardly from an inner wall of the hollow body 11 and are arranged at two opposite ends of the hollow body 11; that is to say each pair of radial ribs 13, 14 and 15 is arranged symmetrically relative the longitudinal axis X-X of the outer body 10.

Figure 7C:
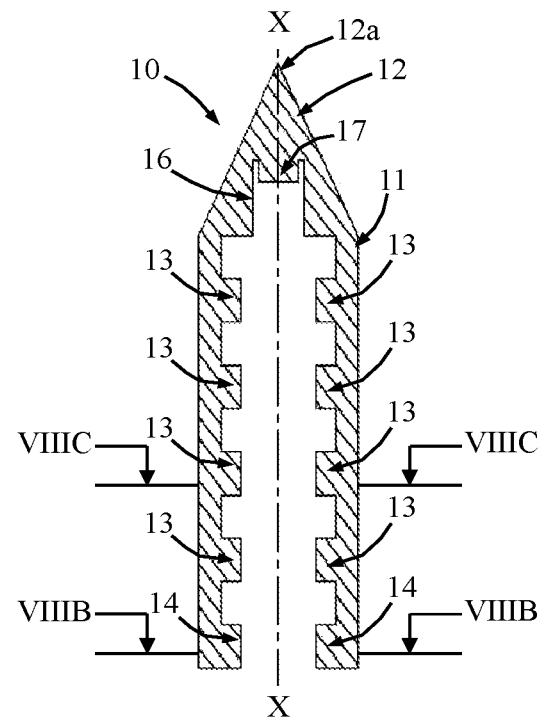
FIG. 7C is a cross-section view of the outer body along line VIIC-VIIC of FIG. 7B.

FIG. 7C is a cross-section view of outer body 10 along line VIIC-VIIC of FIG. 7B. The head 12 further comprises a blind hole 16, which in turn comprises a protrusion 17. Protrusion 17 has a diameter which is smaller than the diameter of blind hole 16. In use, blind hole 16 is configured to at least partially accommodate the elastic member 30 (not shown), which in turn drives the inner body 20, as explained herein below. Protrusion 17 is configured such that the space between the protrusion 17 and a side wall of the blind hole 16 can be used to accommodate an end section of the elastic member 30 in a substantially fixed manner.

Figure 8A:
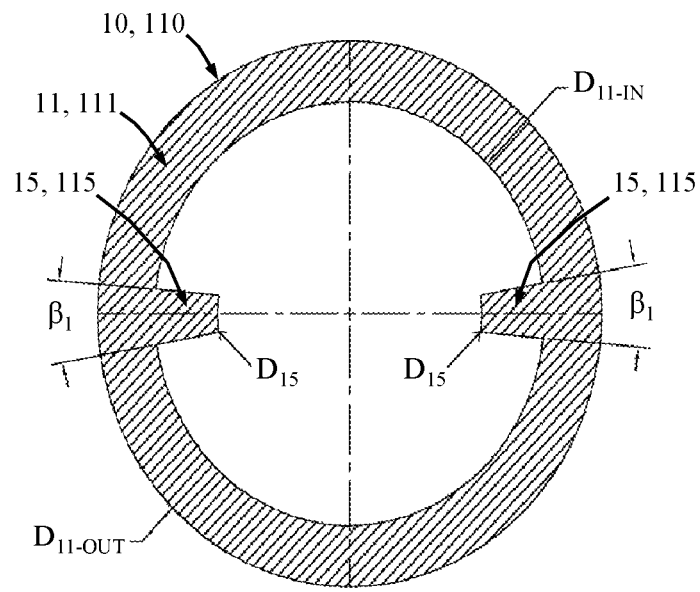
FIG. 8A is a cross-section view of the outer body along line VIIIA-VIIIA of FIG. 7B.

FIG. 8A is a cross-section view of outer body 10 along line VIIIA-VIIIA of FIG. 7B. Each radial rib 15 protrudes inwardly from an inner wall of hollow body 11 of outer body 10. Hollow body 11 has a cylindrical shape with an inner diameter $D_{11\text{-}IN}$ and an outer diameter $D_{11\text{-}OUT}$. Further, each radial rib 15 encompasses or extends by an angle 131 and has a diameter $D_{15}$. It can also be seen that there is a space not covered by the radial ribs 15 which serves to accommodate and allow passage of the radial ribs 22, 23 of inner body 20 as explained below. Moreover, diameter $D_{11\text{-}IN}$ of hollow body 11 is greater than diameter $D_{15}$, such that $D_{11\text{-}IN} > D_{15}$.

By way of example, in embodiments of the invention, angle 131 is equal to 15°±5°; diameter $D_{15}$ is equal to 4.2 mm±0.2 mm; diameter $D_{11\text{-}IN}$ is equal 6.2 mm±0.2 mm; and diameter $D_{11\text{-}OUT}$ is equal to 8.0 mm±0.2 mm.

Figure 8B:
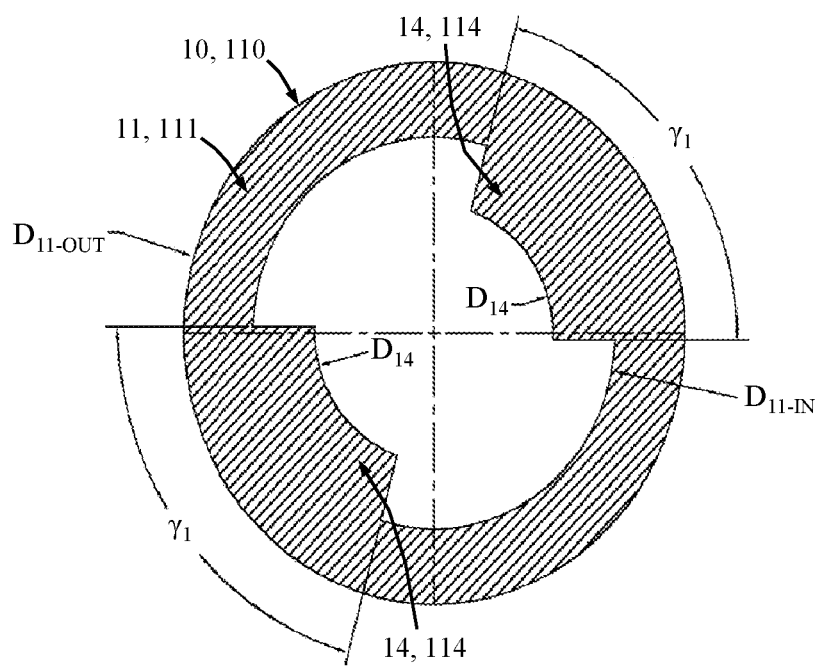
FIG. 8B is a cross-section view of the outer body along line VIIIB-VIIIB of FIG. 7C.

FIG. 8B is a cross-section view of outer body 10 along line VIIIB-VIIIB of FIG. 7C. Each radial rib 14 protrudes inwardly relative the longitudinal axis of outer body 10. Further, each radial rib 14 encompasses or extends by an angle $\gamma_1$ which is greater than angle 131 of radial ribs 15, such that $\gamma_1 > \beta_1$, and each radial rib 14 has a diameter $D_{14}$ which is smaller than diameter $D_{15}$ of the radial ribs 15, such that $D_{14} < D_{15}$. Inner diameter $D_{11\text{-}IN}$ is greater than diameter $D_{14}$, such that $D_{11\text{-}IN} > D_{14}$. It can also be appreciated that there is a space not covered by the radial ribs 14, which in particular allows for passage of the ribs 22 of inner body 20 during movement of the inner body 20 from the retracted position to the extended position, as it is to be explained below.

By way of example, angle $\gamma_1$ is equal to 75°±5°, and diameter $D_{14}$ is equal to 3.8 mm±0.2 mm.

FIG. 8C is a cross-section view of outer body 10 along line VIIIC-VIIIC of FIG. 7C. Each radial rib 13 protrudes inwardly relative the longitudinal axis of outer body 10. Further, each radial rib 13 encompasses or extends by an angle $\gamma_2$ and has a diameter $D_{13}$. Extension angle $\gamma_2$ of radial ribs 13 is equal to the extension angle $\gamma_1$ of radial rib 14, such that $\gamma_2 = \gamma_1$. Furthermore, diameter $D_{13}$ of radial ribs 13 is greater than diameter $D_{14}$ of the radial ribs 14, such that $D_{13} > D_{14}$. Moreover, diameter $D_{13}$ of radial ribs 13 is equal to diameter $D_{15}$ of radial ribs 15, such that $D_{13} = D_{15}$. It can also be seen that there is a space not covered by the radial ribs 13, which allows for passage of the ribs 22 and 23 of the inner body 20 during movement of inner body 20 from the retracted position to the extended position as it is to be explained below.

By way of example, angle $\gamma_2$ is equal to 75°±5°, and diameter $D_{13}$ is equal to 4.2 mm±0.2 mm.

FIG. 8D is a cross-section view of device 1 along line VIIID-VIIID of FIG. 4A. Each radial rib 15 serves as stop for a respective radial rib 22 (and for each radial rib 23) of inner body 20. In this position of inner body 20 relative the outer body 10 (also shown in FIG. 4A), a lower face of the radial ribs 22, 23 that remain inside the outer body 10 abuts at least partially against an upper face of a respective radial rib 13, 14, and an upper face of the radial ribs 22, 23 that remain inside the outer body 10 abuts at least partially against a lower face of a respective radial rib 13, 14, thus forming a snug fit among radial ribs 22, 23 and radial ribs 13, 14. Consequently, the position of the inner body 20 relative the outer body 10 can be maintained.

On the other hand, diameter $D_{15}$ of radial ribs 15 of outer body 10 is greater than diameter $D_{21}$ of cylindrical body 21 of inner body 20, such that $D_{15} > D_{21}$. Further, inner diameter $D_{11\text{-}IN}$ of hollow body 11 of outer body 10 is greater than the diameter $D_{22}$ and $D_{23}$ of radial ribs 22, 23 respectively, such that $D_{22} < D_{11\text{-}IN} > D_{23}$. Moreover, as mentioned above in relation to FIG. 8A, the spaces not covered by the radial ribs 15 are greater than the extension angles $\alpha_1$ and $\alpha_2$ of the radial ribs 22 and 23 respectively such that the inner body 20 is able to at least partially rotate about its longitudinal axis until a position in which a side face of the ribs 22, 23 abut against a side face of the ribs 15 as shown in FIG. 8D.

FIG. 8E is a cross-section view of device 1 in which the inner body 20 has been rotated about its longitudinal axis and it is now able to pass through the outer body 10. In this position of inner body 20 relative the outer body 10, the inner body 20 can be driven by the elastic member 30 from a retracted position to an extended position in such a manner that the radial ribs 23—and also radial ribs 22—are able to pass through the spaces not covered by the radial ribs 13—and radial ribs 22 are also able to pass through the spaces not covered by the radial ribs 14—of outer body 10 until a position in which the radial ribs 23, in particular a lower face of radial ribs 23, abut against the radial ribs 14, in particular an upper face of radial ribs 14, at the bottom end of outer body 10 (see for example FIG. 4B). In the latter position, inner body 20 is stopped and prevented from exiting the outer body 10 because the space not covered by the radial ribs 14 is smaller in dimension than the extension angle $\alpha_2$ of the radial ribs 23.

Turning now to FIGS. 9A-9E, the steps for manipulating the device 1 and cause movement of inner body 20 relative the outer body 10 from a retracted position to an extended position according to embodiments of the invention will be described.

Figure 9A:
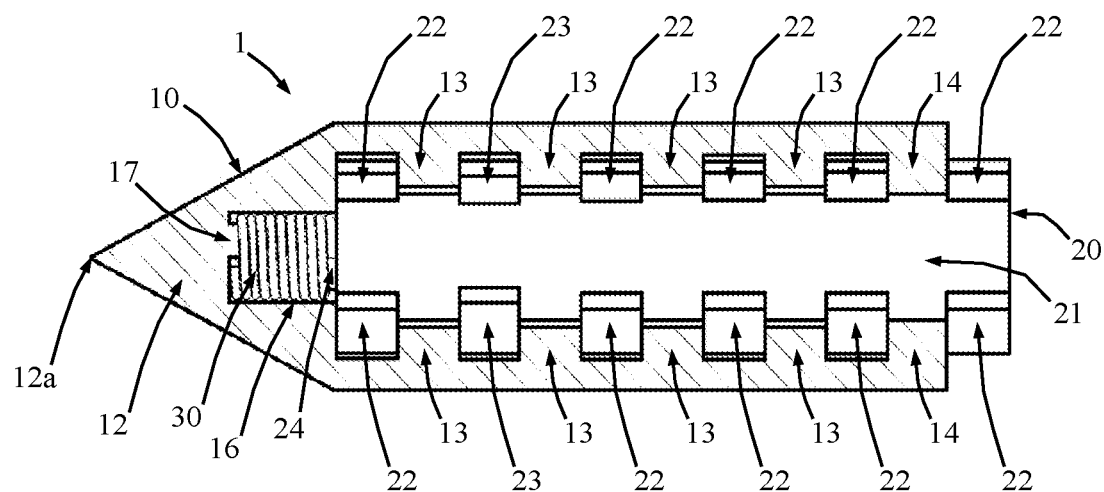
FIG. 9A is a front view of the device in a retracted position according to embodiments of the invention, where the outer body of the device is shown in cross-section.

FIG. 9A is a front view of device 1 according to embodiments of the invention. Outer body 10 is depicted in cross-section, for example as shown in FIG. 7C, whereas inner body 20 and elastic member 30 are depicted as complete elements for the sake of clarity. The inner body 20 is in a retracted position relative the outer body 10; this means that at least most part of inner body 20 is accommodated inside the outer body 10. It can also be seen that the radial ribs 22, 23 of inner body 20 that remain inside outer body 10 fit in an adjusted manner between the radial ribs 13, 14. In this position, elastic member 30 is received inside blind hole 16 of head 12 of outer body 10 but it is also at least partially accommodated around protrusion 24 of inner body 20, whereby elastic member 30 is in a compressed state exerting force between outer body 10 and inner body 20, such that a surface of the radial ribs 22, 23 is abutting against a surface of a respective adjacent radial rib 13, 14. In FIG. 9A, a right-side surface of each radial rib 22, 23 abut against a left-side surface of an adjacent radial rib 13, 14, respectively.

Furthermore, at least one pair of radial ribs 22 lies outside the outer body 10 which, in use, allow a user to rotate the inner body 20 relative the outer body 10 as described below in relation to FIGS. 9B-9D.

Figure 9B:
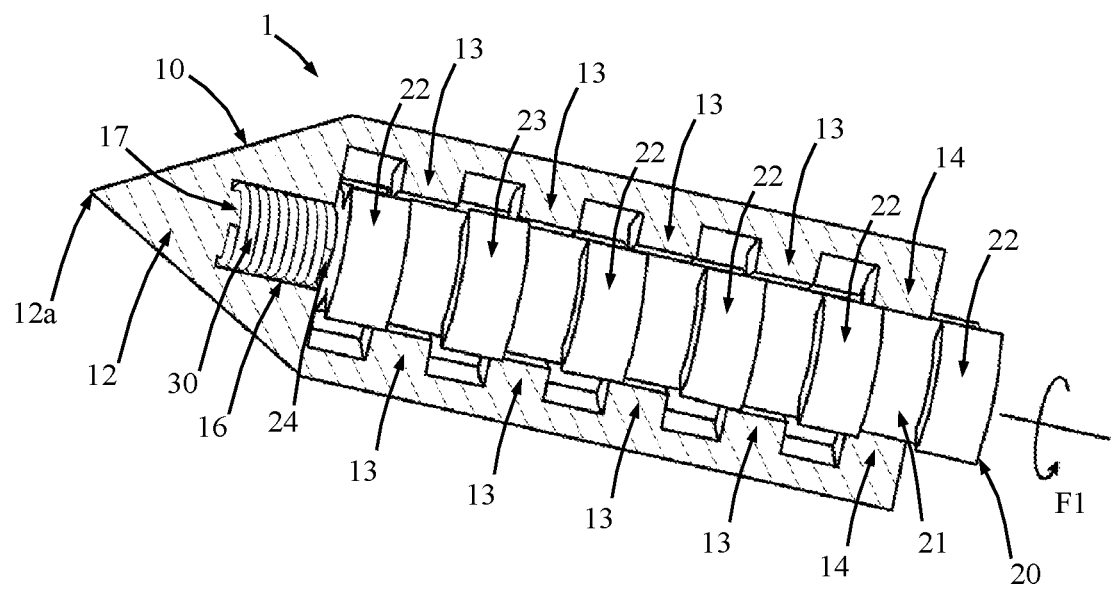
FIG. 9B is a front-perspective view of the device depicted in FIG. 9A, where the inner body has been rotated in a first direction about its longitudinal axis relative the outer body.
Figure 9C:
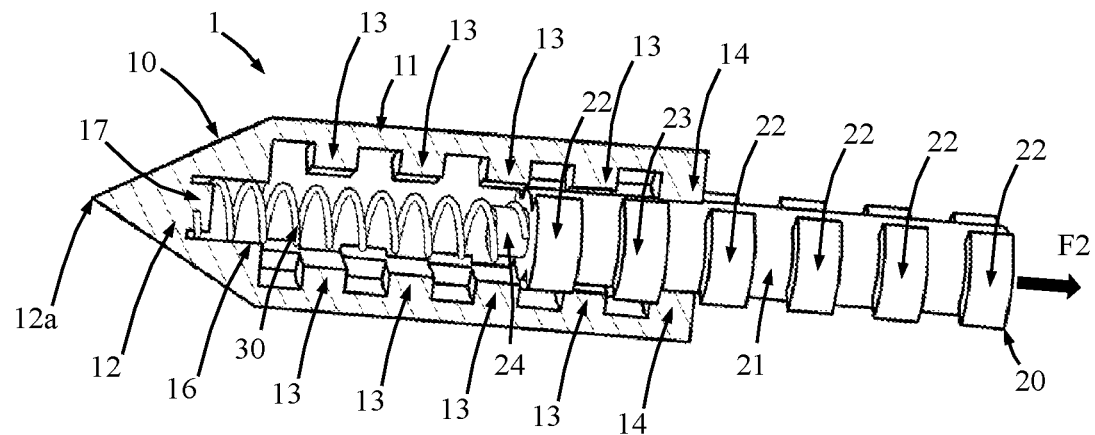
FIG. 9C is a front-perspective view of the device depicted in FIG. 9B, where the inner body has been biased by an elastic member so that a portion of the inner body lies outside the outer body of the device.
Figure 9D:
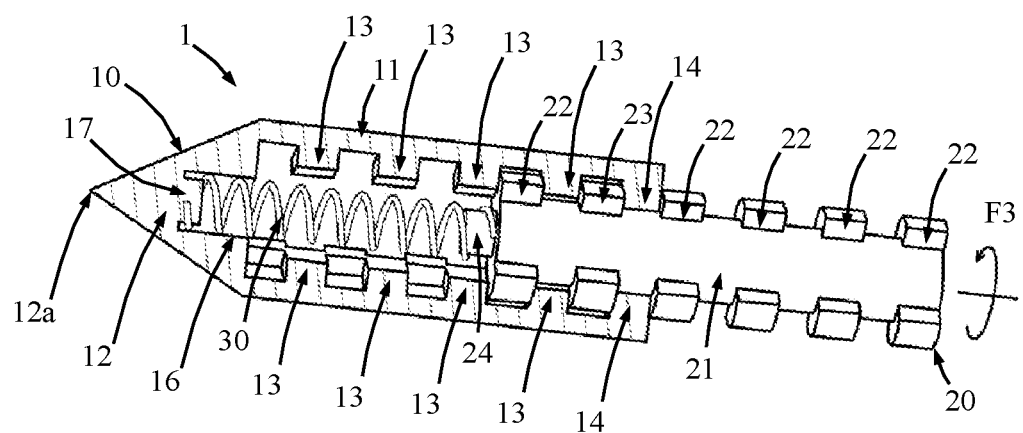
FIG. 9D is a front-perspective view of the device depicted in FIG. 9C, where the inner body has been rotated in a second direction about its longitudinal axis relative the outer body.
Figure 9E:
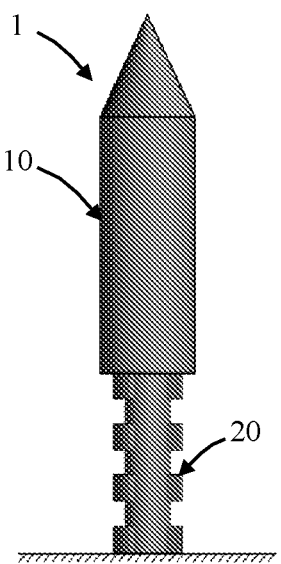
FIG. 9E is a front view of the device in an extended position, according to which it can fracture a bottom of a container.

FIGS. 9B-9D are front-perspective views of the device 1 showing rotation and displacement of inner body 20 relative the longitudinal axis of outer body 10. In these drawings, some references have been omitted for the sake of brevity and simplicity. In this embodiment of the device, a user can cause rotation of the inner body 20 relative the outer body 10 by means of a finger nail, a coin or any other similar object which is partially introduced in the notch 25 of base section 26, i.e. at the bottom end of inner body 20 (see FIG.

5C). Inner body 20 is caused to rotate about its longitudinal axis in a first direction shown by arrow F1, for example counter-clockwise, such that the radial ribs 22, 23 no longer abut against the radial ribs 13, 14 respectively. At this position shown in FIG. 9B, on the one hand, the radial ribs 22 are able to pass through the spaces not covered by the radial ribs 13, 14 and 15 of outer body 10 and, on the other hand, the radial ribs 23 are able to pass through the spaces not covered by the radial ribs 13 and 15 of outer body 10 (see for example FIG. 8E).

Subsequently, as shown in FIG. 9C, inner body 20 is driven along its longitudinal axis following direction of arrow F2, i.e. outwards the outer body 10, due to action of the elastic member 30 until a position in which at least a portion of the radial ribs 23 abut against at least a portion of the radial ribs 14. In this position, inner body 20 is prevented from going completely out the outer body 10 because, on the one hand, the spaces not covered by the radial ribs 14 of outer body 10 (FIG. 8B) are substantially smaller than the angular extension $\alpha_2$ of the radial ribs 23 of inner body 20 (FIG. 6B) and, on the other hand, diameter $D_{14}$ of radial ribs 14 is smaller than diameter $D_{23}$ of radial ribs 23 of inner body 20.

Accordingly, inner body 20 cannot pass through the space which is not covered by the radial ribs 14 of outer body 10; consequently, at least a section of inner body 20 is retained inside outer body 10. At this position, user is able to cause rotation of the inner body 20 relative the outer body 10 in a second direction opposite to that shown in FIG. 9B, for example clockwise indicated by arrow F3 (see FIG. 9D), such that a lower face of the radial ribs 22, 23 that remain inside the outer body 10 abuts at least partially against an upper face of a respective radial rib 13, 14, and an upper face of the radial ribs 22, 23 that remain inside the outer body 10 abuts at least partially against a lower face of a respective radial rib 13, 14, thus forming a snug fit among the two pairs of radial ribs 22, 23 inside the outer body 10 and the lower radial ribs 13, 14. This is snug fit among radial ribs 13, 14 and radial ribs 22, 23 is reinforced due to action of elastic member 30 which still exerts force against the inner body 20. This position of device 1, in which a portion of inner body 20 lies outside the outer body 10 and the remaining portion of inner body 20 remains inside the outer body 10 (see FIG. 9E), corresponds to that depicted for example in FIGS. 2B, 3B and 4B. Furthermore, as depicted in FIG. 2B, at least a portion of device 1, in particular a portion of inner body 20, protrudes by a distance D out of recess R of container C such that the base section 26 of inner body 20 is able to impact against a solid surface, such as a table, in order to direct the impact force towards the housing H of container C thus being able to cause, in a safe and targeted manner, a fracture at the bottom section of container C.

After causing a fracture at the bottom section of container C, user can discard the container to trash being sure that said container cannot be reused or recycled with any other contents because the container would inevitably leak.

Figure 10A:
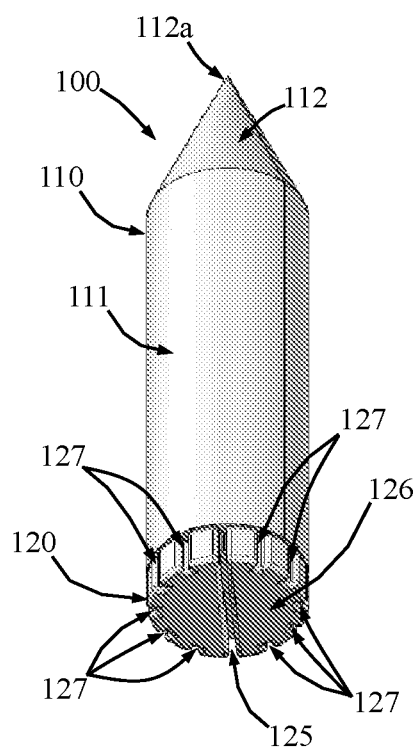
FIG. 10A is a bottom-perspective view of a further embodiment of the device, where the device is in a retracted position.
Figure 10B:
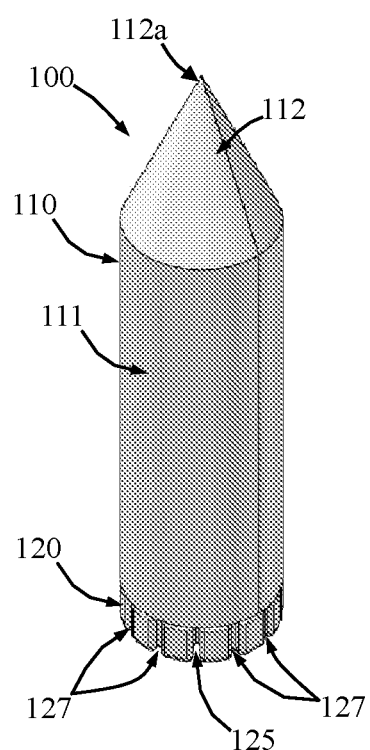
FIG. 10B is a top-perspective view of the device depicted in FIG. 10A.

FIG. 10A is a bottom-perspective view of a device 100 for causing a fracture to a bottom section of a container C according to further embodiments of the invention. Here the device 100 is in a retracted position. FIG. 10B is a top-perspective view of the device 100 according to FIG. 10A.

FIG. 10C is a bottom-perspective view of device 100 in an extended position, and FIG. 10D is a top-perspective view of device 100 according to FIG. 10C.

Device 100 comprises an outer body 110 and an inner body 120 which can rotate and slide inside and relative the outer body 110. Outer body 110 comprises a hollow body 111, which for example has an essentially cylindrical shape with an inner diameter $D_{11\text{-}IN}$ and an outer diameter $D_{11\text{-}OUT}$, and a head 112 at one end of the hollow body 111. Head 112 for example is conically shaped such that it can direct in a targeted manner all forces applied to it at a tip 112a of said head 112, thus being able to cause a fracture to the housing H of container C as previously explained.

Figure 10G:
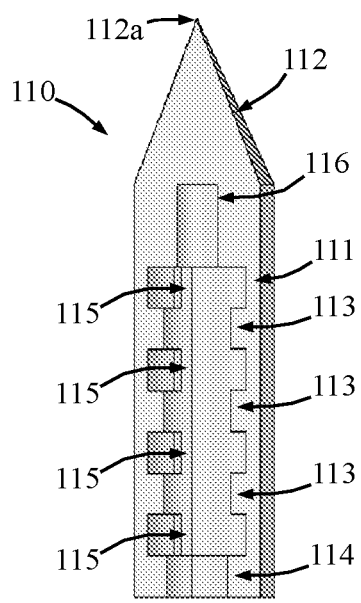
FIG. 10G is front-perspective view of the outer body of device according to further embodiments of the invention.

As shown in FIGS. 10E and 10G, hollow body 111 of outer body 110 comprises a plurality of radial ribs 113, 114 and 115 designed as semi-circumferential protrusions which are arranged separated from each other at equal distances along a longitudinal section of hollow body 111. Further, radial ribs 14 are arranged at the bottom end of the hollow body 111 by taking FIG. 10E as reference. Radial ribs 113, 114 and 115 protrude inwardly from an inner wall of the hollow body 111 and are arranged at two opposite ends of the hollow body 111; that is to say each pair of radial ribs 113, 114 and 115 is arranged symmetrically relative the longitudinal axis of outer body 110. Each radial rib 115 encompasses or extends by an angle $\beta_1$ and has a diameter $D_{15}$ (see FIG. 8A). Each radial rib 113 encompasses or extends by an angle $\gamma_2$ and has a diameter $D_{13}$ (see FIG. 8C). Each radial rib 114 encompasses or extends by an angle $\gamma_1$ which is greater than angle $\beta_1$ of radial ribs 115 (see FIG. 8B), such that $\gamma_1 > \beta_1$, and each radial rib 114 has a diameter $D_{14}$ which is smaller than diameter $D_{15}$ of the radial ribs 115, such that $D_{14} < D_{15}$.

By way of example, in embodiments of the invention, angle $\beta_1$ is equal to 15°±5°; diameter $D_{15}$ is equal to 4.2 mm±0.2 mm; angle $\gamma_2$ is equal to 75°±5°; diameter $D_{13}$ is equal to 4.2 mm±0.2 mm; angle $\gamma_1$ is equal to 75°±5°; diameter $D_{14}$ is equal to 3.8 mm±0.2 mm. Diameter $D_{11\text{-}IN}$ is equal 6.2 mm 0.2 mm; and diameter $D_{11\text{-}OUT}$ is equal to 8.0 mm±0.2 mm;

Hollow body 111 further includes a blind hole 116 and a protrusion 17 which are configured to accommodate at least partially an elastic member 30 as depicted in FIG. 10E, which elastic member 30 in turn drives the inner body 120 from a retracted position to an extended position.

Furthermore, as shown in FIG. 10G, at least a plurality of radial ribs 115 is aligned with the plurality of radial ribs 113 and 114 in such a manner that together form an unbroken rib extending along a longitudinal section of hollow body 111 and which serves to guide movement of inner body 120 relative the outer body 110 from the retracted position to the extended position.

Turning now to FIG. 10F, the inner body 120 comprises a cylindrical body 121 and a plurality of radial ribs 122, 123 protruding from an outer wall of the cylindrical body 121 and arranged separated at equal distances from each other along a longitudinal section of the cylindrical body 121 and at opposite sides of the cylindrical body 121.

Each radial rib 122 is designed as a semi-circumferential protrusion having a diameter $D_{22}$. Further, each radial rib 123 is designed as a semi-circumferential protrusion having a diameter $D_{23}$ (see FIGS. 6A-6B).

Inner body 120 further comprises a protrusion 124 at an upper end of cylindrical body 121 which can accommodate at least partially the elastic member (not shown) when the inner body 120 is mounted inside outer body 110. Again, the elastic member is configured to drive the inner body 120 inside and relative the outer body 10 during movement from a retracted position to an extended position.

Inner body 120 further comprises a notch 125 at a base section 126 of the inner body 120. Base section 126 has an essentially cylindrical shape including a plurality of grooves 127 which extend longitudinally. In use, the notch 125 can be manipulated by a user to cause rotation of the inner body 120 relative outer body 110 for example by using a finger nail, a coin or any other similar object. In addition, or alternatively, base section 126 can be manipulated by the user directly with his fingers because the grooves 127 assist in the gripping of said base section 126 to cause rotation of the inner body 120 relative the outer body 110.

Accordingly, a user is able to cause rotation of inner body 120 relative the outer body 110 by manipulating either or both of the notch 125 and base section 126 such that the radial ribs 122, 123 are able to pass through the spaces not covered by the radial ribs 113, 114, in the same manner as the radial ribs 22, 23 pass through the spaces not covered by the radial ribs 13, 14 of device 1 previously described.

Each radial rib 122, similar to radial ribs 22 of device 1 described above, encompasses or extends by an angle $\alpha_1$ and is configured as a semi-circumferential protrusion (see FIG. 6A). Each radial rib 123, similar to radial ribs 23 of device 1, encompasses or extends by an angle $\alpha_2$ and is configured as a semi-circumferential protrusion (see FIG. 6B). Once again, angle $\alpha_2$ of radial ribs 123 is greater than angle $\alpha_1$ of radial ribs 22, such that $\alpha_2 > \alpha_1$. For example, angle $\alpha_2$ is at least 8° greater than angle $\alpha_1$. In particular, angle $\alpha_2$ may be 5°, 10° or up to 15° greater than angle $\alpha_1$.

Cylindrical body 121 has an outer diameter $D_{21}$. Radial ribs 122 and 123 are configured having a diameter $D_{22}$ and $D_{23}$, respectively.

By way of example, in embodiments of the invention, angle $\alpha_1$ is equal to 86°±5°; angle $\alpha_2$ is equal to 94°±5°; diameter $D_{21}$ is equal to 3.8 mm±0.2 mm; and diameter $D_{22}$=diameter $D_{23}$ is equal to 5.8 mm±0.2 mm.

In use of device according to embodiments of the invention, device 100 is in a retracted position as shown in FIGS. 10A-10B. In this position also depicted in FIG. 10E, the plurality of radial ribs 122, 123 of inner body 120 abut against the plurality of radial ribs 113, 114 due to action of the elastic member (not shown) which pushes inner body 120 towards outer body 110 such that a lower face of the radial ribs 122, 123 rests on an upper face of the radial ribs 113, 114. Likewise, in this position, a side face of the radial ribs 122, 123 abut against a side face of the radial ribs 115 which act as stops for the radial ribs 122, 123. Then, a user is able to rotate inner body 120 relative the outer body 110, for example in a counter-clock direction, by manipulating the base section 126 with his fingers and/or by means of a finger nail, a coin or a similar object that is partially introduced in the notch 125 of base section 126, until the radial ribs 122, 123 are able to pass through the spaces not covered by the radial ribs 113, 114 and 115 respectively.

Subsequently, inner body 120 is driven by the elastic member outward outer body 110, i.e. from a retracted position to an extended position, until at least a portion of the radial ribs 123 encounter with at least a portion of the radial ribs 114 of outer body 110. Again, inner body 120 is prevented from going completely out of the outer body 110 because the angular extension $\alpha_2$ of the radial ribs 123 is greater than the space not covered by the radial ribs 114 at the bottom section of outer body 110. In this position, user can rotate inner body 120 relative outer body 110 in an opposite direction to the previous one, in this example clockwise, such that the radial ribs 122 and 123 that still remain inside the inner body 110 abut against some of the radial ribs 113 and 114 of outer body 110, whereby the device 100 retains its extended position.

Once device 100 is in an extended position as shown for example in FIGS. 10C-10D, a user can hit the base section 126 against a solid surface, such as a table, to direct the impact force towards the housing H of container C thus causing in a safe and targeted manner a fracture at the bottom section of container C.

As already mentioned, a container having a fracture for example at the bottom section thereof, which is caused by the device according to embodiments of the invention cannot be used anymore with liquid products, such as adulterated beverages, because the container would inevitably leak.

On the other hand, outer bodies 10 and 110 of devices 1 and 100 respectively can be manufactured in one piece from plastic material, for example by injection molding, compression molding or three-dimensional printing. Similarly, inner bodies 20 and 120 of devices 1 and 100 respectively can be manufactured in one piece from a plastic material, for example by injection molding, compression molding or three-dimensional printing. Plastic material can be selected from acrylic, polyethylene terephtalate (PET), polypropylene (PP), polycarbonate (PC), nylon or any other similar material having high resistance to impacts. Further, plastic material can also be fiber-reinforced plastic or composite plastic.

Alternatively, outer bodies 10, 110, and inner bodies 20, 120, of devices 1 and 100 respectively can be manufactured from metal, for example aluminum, bronze, brass, steel or a similar material having strength sufficient to cause fractures to glass or ceramic materials. Outer and inner bodies made of metal can be produced for example by die casting or milling as adequate depending on the dimensions of the device.

Nevertheless, according to embodiments of the invention, it is also possible for the outer body of the device to be manufactured with at least two separate parts which can be assembled together to form an integral body. In this connection, FIGS. 11A, 11B and 11C show a device 200 for causing a fracture in a bottom section of a container according to such embodiments of the invention.

Device 200 comprises an outer body 210 and an inner body 220 which can rotate and slide relative the outer body 210. Outer body 210 comprises a hollow body 211 and a head 212 at one end of the hollow body 211. For example, hollow body 211 is cylindrically shaped having an inner diameter $D_{11-IN}$ and an outer diameter $D_{11-OUT}$; and head 212 is conically shaped. In embodiments of the invention, unlike outer bodies 10 and 100 of devices 1 and 100 respectively, outer body 210 of device 200 is formed from a first part 210a and a second part 210b which can be assembled together to form an integral body 210.

Figure 11A:
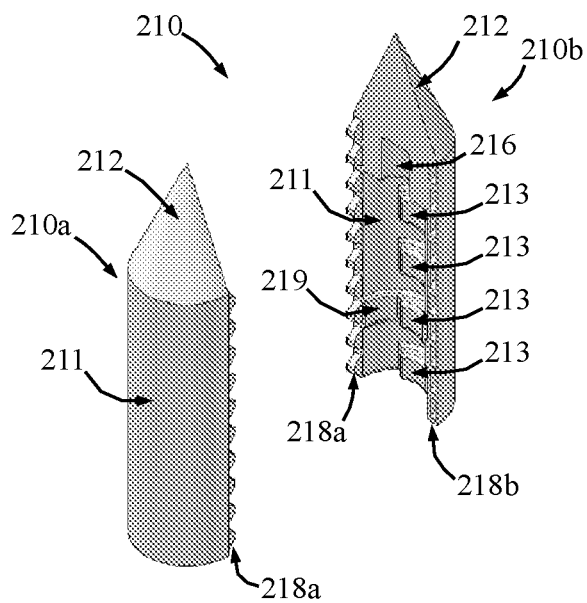
FIG. 11A is a top-perspective view of an outer body of a device according to further embodiments of the invention.
Figure 11B:
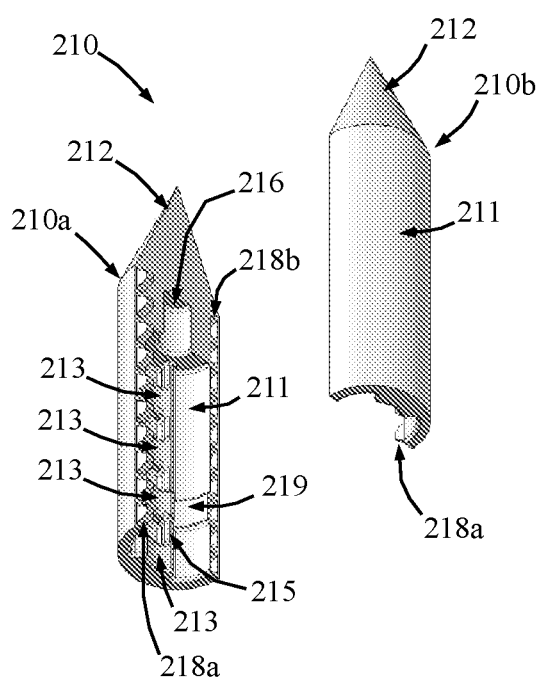
FIG. 11B is a bottom-perspective view of the outer body of device depicted in FIG. 11A.
Figure 11C:
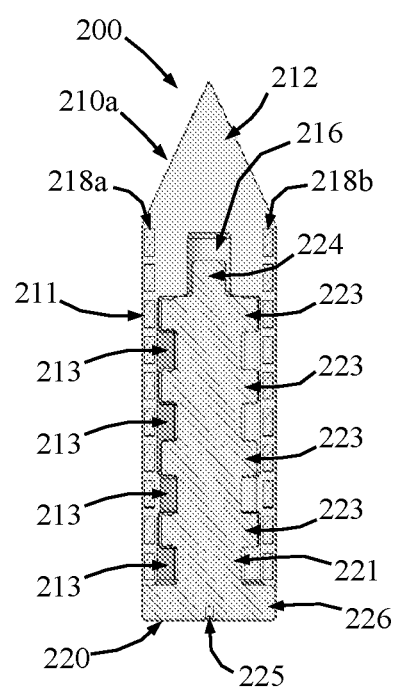
FIG. 11C is a cross-section view of the device according to further embodiments of the invention.

As shown in FIGS. 11A and 11B, each part 210a and 210b comprises a plurality of teeth 218a and recesses 218b arranged at respective opposite side edges of the hollow body 211 in such a manner that the plurality of teeth 218a of part 210a can be accommodated inside the plurality of recesses 218b of part 210b and the plurality of teeth 218a of part 210b can be accommodated inside the plurality of recesses 218b of part 210a, thus forming an integral hollow body 210.

In addition, in the case of device being is made of plastic material, adhesive means can be also used to generate or improve coupling between the plurality of teeth 218a and the plurality of recesses 218b of the parts 210a and 210b. Alternatively, in the case of device being made of metal, either suitable adhesive means or adhesive or a welding technique can be used to generate the coupling between the plurality of teeth 218a and the plurality of recesses 218b of the parts 210a and 210b.

Each part 210a, 210b further comprises a plurality of radial ribs 213, 215 protruding inwardly from an inner wall of hollow body 211 and separated from each other at equal distances along a longitudinal section of the hollow body 211. Further, as shown in FIG. 11B, the plurality of radial ribs 213 and 215 of at least one part 210a, 210b is arranged in such a manner that they form an unbroken rib extending along a longitudinal section of the hollow body 211 and which serves in use to guide movement of inner body 220 relative the outer body 210 from a retracted position to an extended position.

Figure 12A:
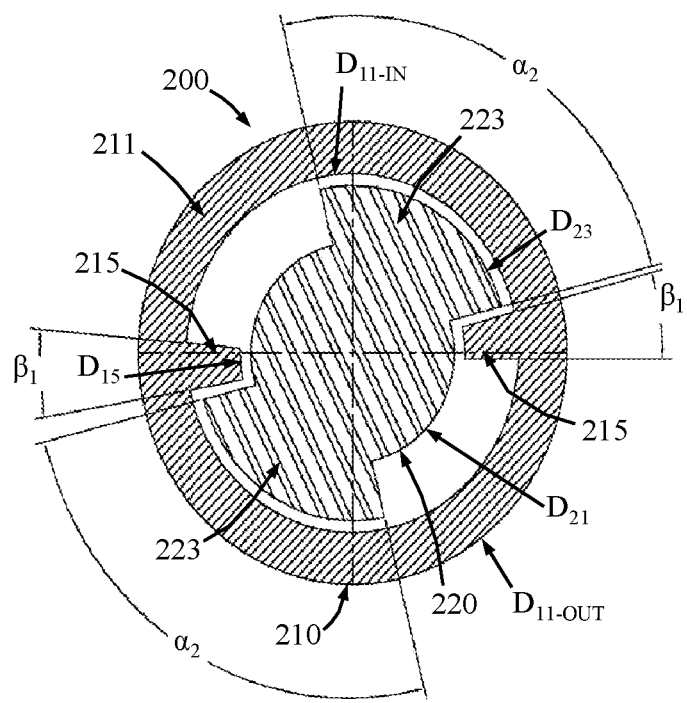
FIG. 12A is a cross-section view of the device according to further embodiments of the invention.
Figure 12B:
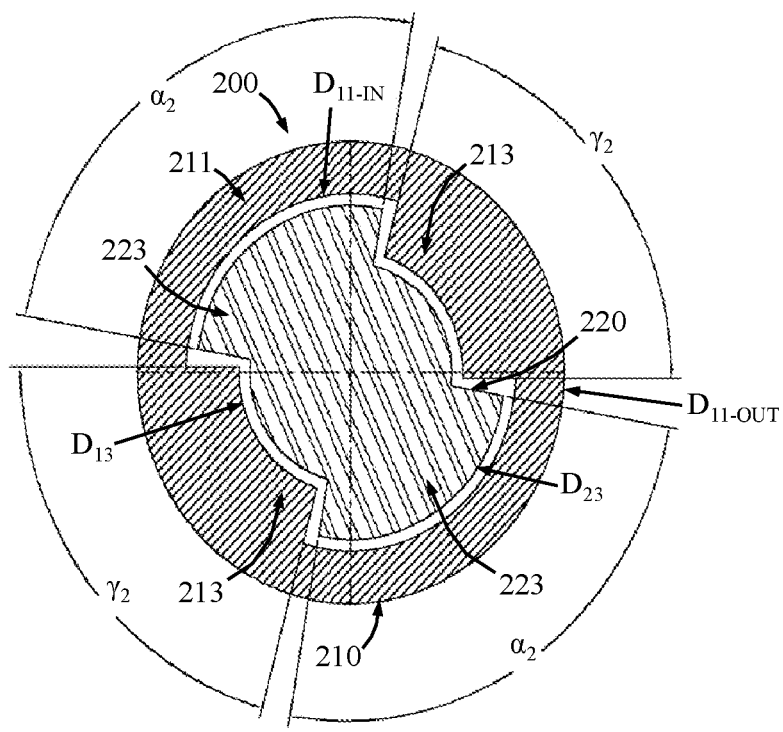
FIG. 12B is a cross-section view of the device according to further embodiments of the invention.

Furthermore, as shown in FIG. 12A, each radial rib 215 is designed as a semi-circumferential protrusion and encompasses or extends by an angle $\beta_1$ and has a diameter $D_{15}$. Likewise, as shown in FIG. 12B, each radial rib 213 is designed as a semi-circumferential protrusion and encompasses or extends by an angle $\gamma_2$ and has a diameter $D_{13}$. In embodiments of the invention, diameter $D_{13}$ of radial ribs 213 is equal to diameter $D_{15}$ of radial ribs 215, such that $D_{13}=D_{15}$. Extension angle $\gamma_2$ of radial ribs 213 is greater than extension angle $\beta_1$ of radial ribs 215, such that $\gamma_2>\beta_1$.

In position of inner body 220 relative the outer body 210 shown in FIG. 11C, a lower face of the radial ribs 223 that remain inside the outer body 210 abuts at least partially against an upper face of a respective radial rib 213, and an upper face of the radial ribs 223 that remain inside the inner body 10 abuts at least partially against a lower face of a respective radial rib 213, thus forming a snug fit among radial ribs 223 of inner body 220 and radial ribs 213 of outer body 210. Consequently, position of the inner body 220 relative the outer body 210 can be maintained.

In addition, parts 210a and 210b form together a blind hole 216 which is configured, on the one hand, to at least partially accommodate an elastic member (not shown) which in turn is able to drive the inner body 220 from a retracted position to an extended position relative the outer body 210 and, on the other hand, to at least partially receive a projection 224 of inner body 220 (see FIG. 11C).

At least one of the first and second parts 210a, 210b further comprises a semi-circumferential projection 219 which is arranged next to at least one of the radial ribs 213 and which projects inwardly from the inner wall of hollow body 211. Said projection 219 has a semi-circumferential shape and has a diameter which is smaller than the inner diameter $D_{11\text{-}IN}$ of hollow body 211 but at the same time is greater than diameter $D_{13}$ of the radial ribs 213 (see for example FIG. 12B).

Turning now to FIG. 11C, there is shown a cross-section view of device 200 including the part 210a of outer body 210 and inner body 220 which is in a retracted position relative the outer body 210. Protrusion 224 is at least partially received in blind hole 216.

Inner body 220 comprises a cylindrical body 221 and a plurality of radial ribs 223 protruding from an outer wall of the cylindrical body 221 and arranged separated at equal distances from each other along a longitudinal section and at opposite sides of the cylindrical body 221.

As shown in FIGS. 12A and 12B, each radial rib 223 is designed as a semi-circumferential protrusion and encompasses or extends by an angle $\alpha_2$ which is greater than the angle $\beta_1$ of outer body 210; likewise, each radial rib 223 has a diameter $D_{23}$ which is smaller than the inner diameter $D_{11\text{-}IN}$ but greater than diameter $D_{13}$ and $D_{15}$ of radial ribs 213 and 215 respectively of outer body 211.

By way of example, in embodiments of the invention, angle $\beta_1$ is equal to 15°±5°; diameter $D_{15}$ is equal to 4.2 mm±0.2 mm; diameter $D_{11\text{-}IN}$ is equal to 6.2 mm±0.2 mm; diameter $D_{11\text{-}OUT}$ is equal to 8.0 mm±0.2 mm; angle $\gamma_2$ is equal to 75°±5°; diameter $D_{13}$ is equal to 4.2 mm±0.2 mm; angle $\alpha_2$ is equal to 94°±5°; diameter $D_{21}$ is equal to 3.8 mm±0.2 mm; and diameter $D_{23}$ is equal to 5.8 mm±0.2 mm.

Once again, the space not covered by the radial ribs 215 serves to accommodate the radial ribs 223 of inner body 220. Further, the radial ribs 215 also stop rotation of the inner body 220 relative the outer body 210 by coming into contact a side surface of the radial ribs 215 with a side surface of the radial ribs 223 (see for example FIG. 12A) such that inner body 220 can be maintained in its position, either retracted or extended, relative the outer body 210. Similarly, the space not covered by the radial ribs 213 allows passage of the radial ribs 223 of inner body 220 during movement from a retracted position to an extended position (see for example FIG. 12B).

Returning to FIG. 11C, inner body 220 further comprises a cylindrically shaped base section 226 at the lower end thereof. Base section 226 includes a notch 225 which can be manipulated by a user to cause rotation of the inner body 220 relative the outer body 210 for example by using a finger nail, a coin or any other similar object, and a plurality of grooves 227 (not shown) which extend longitudinally along the length of the base section 226. In use of the device, base section 226 and grooves 227 assist in the gripping of said base section 126 by a user with his fingers.

In the position shown in FIG. 11C, projection 224 at the upper end of cylindrical body 221 is at least partially received inside the blind hole 216 of outer body 210. It can also be appreciated that there is a gap between the side wall of projection 224 and the side wall of blind hole 216 which can be used to accommodate an elastic member such as a spring (not shown). Further, in this position a side face of the plurality of radial ribs 223 of inner body 220 abut against a respective side face of the plurality of radial ribs 215 of outer body 210 (see for example FIG. 12A), such that the radial ribs 215 act as stops for the radial ribs 223 preventing further rotation of inner body 220 in one direction.

In use of the device 200, inner body 220 can be moved from a retracted position to an extended position in the following manner. In the position shown in FIG. 11C, inner body 220 can be manipulated by a user with a finger nail, a coin or a similar object introduced in the notch 225 at the base section 226 or directly with his fingers pressing on the base section 226 to rotate the inner body 220 relative the outer body 210 in a first direction, for example counter-clockwise, until side faces of the radial ribs 223 abut against the longitudinal rib formed by the plurality of ribs 215-213 of outer body 210. Subsequently, the plurality of radial ribs 223 are able to pass through the spaces not covered by the radial ribs 213 and 215 of outer body 210 (see for example FIG. 12B); however, projection 219 stops movement of inner body 220 outward the outer body 210 because said projection 219 has a diameter substantially smaller than the diameter $D_{23}$ of the radial ribs 223 of inner body 220 but the diameter of said projection 219 allows for passage of the radial ribs 223 by exerting a pulling force on the inner body 220, in particular when the user exerts a pulling force on the base section 226. In this manner, a user has control on the distance that the inner body 220 extends out of the outer body 210 and, of course, on the distance D that the device projects out the container (see for example FIG. 2B).

Once the inner body 220 projects sufficiently out of the outer body 210, user is able to cause further rotation of the inner body 220 relative the outer body 210 in a second direction opposite the first direction, for example clockwise, such that the radial ribs 223 of inner body 220 that are still inside the outer body 210 abut against the radial ribs 213 of outer body 210 (in a position similar to that shown in FIG.

9D). In this position of device 200, it is possible for a user to impact the device against a solid surface, such as a table, to cause a fracture in the housing of a container inside which the device is installed.

Again, a container having a fracture caused by the device according to embodiments of the invention cannot be used anymore with liquid products because said container would inevitably leak.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCE NUMBERS 1, 100, 200 Device
10, 110, 210 Outer body
11, 111, 211 Hollow body of outer body
12, 112, 212 Head of outer body
12a, 112a Tip of head
13, 113, 213 Radial ribs of outer body
14, 114 Radial ribs of outer body
15, 115, 215 Radial ribs of outer body
16, 116, 216 Blind hole of outer body
17 Protrusion in blind hole of outer body
20, 120, 220 Inner body
21, 121, 221 Cylindrical body of inner body
22, 122 Radial ribs of inner body
23, 123, 223 Radial ribs of inner body
24, 124, 224 Protrusion at upper end of inner body
25, 125, 225 Notch at base section of inner body
26, 126, 226 Base section of inner body
127, 227 Grooves at base section of inner body
210a, 210b Parts of outer body 210
218a Teeth of outer body part 210a, 210b
218b Recesses of outer body part 210a, 210b
219 Projection of outer body 210
30 Elastic member
B bottle known in the state of the art
C container
D distance the device protrudes from the base of the bottle B
H housing for at least partially accommodating the device 1
R recess
X-X longitudinal axis

What is claimed is:

1. A device for fracturing a container made of glass or ceramic, wherein the device comprises:
    an outer body having
        a hollow body including a plurality of radial ribs protruding from an inner wall of the hollow body and arranged separated from each other at equal distances along a longitudinal section of said hollow body, wherein the hollow body includes a space between the outer body radial ribs, and
        a head integrally formed at one end of the hollow body, wherein the head has a conical shape including a tip, and the head comprises a blind hole at least partially receiving an elastic member, and
    an inner body having
        a base section, and
        a cylindrical body having a plurality of radial ribs protruding from an outer wall of said cylindrical body and arranged separated at equal distances from each other along a longitudinal section of said cylindrical body, wherein the inner body includes a space between the inner body radial ribs;
    wherein the inner body is rotatable relative the outer body through manipulation of the inner body base section by a user, wherein rotation of the inner body causes the inner body radial ribs to align with the space between the outer body radial ribs, and the elastic member drives the inner body from a retracted position to an extended position,
    wherein in the extended position, the user further rotates the inner body base section relative to the outer body such that the inner body radial ribs engage with the outer body radial ribs thus forming an engagement able to transmit an impact force applied on the inner body base section towards the head tip of the outer body.

2. The device according to claim 1, wherein the hollow body is designed having one of a cylindrical, rectangular, hexagonal or octagonal shape.

3. The device according to claim 1, wherein the blind hole comprises a protrusion and a side wall, wherein an end section of the elastic member is accommodated between said protrusion and the side wall of the blind hole.

4. The device according to claim 1, wherein the inner body further comprises a protrusion at an end opposite the base section, wherein the inner body protrusion at least partially accommodates an end of the elastic member when the inner body is inside the outer body.

5. The device according to claim 1, wherein the base section includes a notch configured to be manipulated by a user to cause rotation of the inner body relative outer body.

6. The device according to claim 5, wherein the notch extends across two lower radial ribs and the cylindrical body to allow manipulation of the inner body by a user with the use of a fingernail or a coin.

7. The device according to claim 1, wherein the base section has an essentially cylindrical shape including a plurality of longitudinal grooves, wherein the base section is configured to be manipulated with the user's fingers.

8. The device according to claim 1, wherein the outer body is formed from a first parts and a second part which can be assembled together to form an integral body.

9. The device according to claim 8, wherein the first part and the second part further comprises a plurality of teeth and recesses arranged at respective opposite side edges of the hollow body in such a manner that the plurality of teeth of the first part can be accommodated inside the plurality of recesses of the second part and the plurality of teeth of the second part can be accommodated inside the plurality of recesses of the first part thus forming an integral hollow body.

10. The device according to claim 1, wherein at least one of the first part and second part further comprises a projection arranged next to at least one of the radial ribs having a diameter smaller than inner diameter of hollow body but greater than diameter of the radial ribs.

11. The device according to claim 1, wherein the device is made from plastic material, such as acrylic, PET, PP, PC, nylon or a similar material having high resistance to impacts and is manufactured by injection molding, compression molding or three-dimensional printing.

12. The device according to claim 1, wherein the device is made from metal, such as aluminum, bronze, brass, steel or a similar material having strength sufficient to cause fractures to glass or ceramic materials and is manufactured by die casting or milling.

\* \* \* \* \*